US012641060B2

(12) United States Patent
Liu et al.

(10) Patent No.: US 12,641,060 B2
(45) Date of Patent: May 26, 2026

(54) ACCESS CONTROL METHOD AND RELATED DEVICE

(71) Applicant: Huawei Technologies Co., Ltd., Shenzhen (CN)

(72) Inventors: Bingyang Liu, Shenzhen (CN); Xue Yang, Shenzhen (CN); Ting Xu, Nanjing (CN); Chuang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 18/491,421

(22) Filed: Oct. 20, 2023

(65) Prior Publication Data

US 2024/0048528 A1 Feb. 8, 2024

Related U.S. Application Data

(63) Continuation of application No. PCT/CN2021/140388, filed on Dec. 22, 2021.

(30) Foreign Application Priority Data

Apr. 21, 2021 (CN) .......................... 202110430365.8

(51) Int. Cl.
*H04L 9/40* (2022.01)
(52) U.S. Cl.
CPC .......... *H04L 63/0245* (2013.01); *H04L 63/20* (2013.01)

(58) Field of Classification Search
CPC ........................... H04L 63/0245; H04L 63/20
USPC ............................................................ 726/13
See application file for complete search history.

(56) References Cited

U.S. PATENT DOCUMENTS

| | | | |
|---|---|---|---|
| 7,367,052 B1 * | 4/2008 | Desanti | H04L 63/06 709/229 |
| 9,380,025 B2 | 6/2016 | Nellikar et al. | |
| 9,667,551 B2 | 5/2017 | Edsall et al. | |
| 2002/0156785 A1 * | 10/2002 | Kumar | G06Q 10/10 |
| 2006/0106750 A1 | 5/2006 | Smith | |
| 2006/0117058 A1 | 6/2006 | Smith | |
| 2019/0268383 A1 | 8/2019 | Maino et al. | |
| 2020/0389426 A1 | 12/2020 | Enguehard et al. | |
| 2021/0185039 A1 | 6/2021 | Huang | |

FOREIGN PATENT DOCUMENTS

CN          111277543 A          6/2020

OTHER PUBLICATIONS

IEEE Std 802.1X™—2010 (Revision of IEEE Std 802.1X-2004), IEEE Standard for Local and metropolitan area networks—Port-Based Network Access Control, Feb. 5, 2010, total 222 pages.

(Continued)

*Primary Examiner* — Anthony D Brown
(74) *Attorney, Agent, or Firm* — Conley Rose, P.C.

(57) ABSTRACT

A policy enforcement device receives a first data packet sent by a source device. The first data packet carries information about a source security group and information about a destination security group, where the source security group is a security group to which the source device belongs, and where the destination security group is a security group to which a destination device of the first data packet belongs.

21 Claims, 9 Drawing Sheets

(56)          References Cited

OTHER PUBLICATIONS

F. Maino, Ed. et al , "Generic Protocol Extension for VXLAN (VXLAN-GPE) draft-ietf-nvo3-vxlan-gpe-10", Jul. 13, 2020, total 18 pages.

C. Rigney et al, "Remote Authentication Dial In User Service (RADIUS)", Request for Comments: 2865, Jun. 2000, total 76 pages.

B. Aboba et al, "Extensible Authentication Protocol (EAP)", Request for Comments: 3748, Jun. 2004, total 67 pages.

S. Deering et al., "Internet Protocol, Version 6 (IPv6) Specification", Request for Comments: 8200, Jul. 2017, total 42 pages.

* cited by examiner

1

ACCESS CONTROL METHOD AND RELATED DEVICE

CROSS-REFERENCE TO RELATED APPLICATIONS

This is a continuation of International Patent Application No. PCT/CN2021/140388 filed on Dec. 22, 2021, which claims priority to Chinese Patent Application No. 202110430365.8 filed on Apr. 21, 2021. The disclosures of the aforementioned applications are hereby incorporated by reference in their entireties.

TECHNICAL FIELD

This disclosure relates to the communication field, and in particular, to an access control method and a related device.

BACKGROUND

A security group is a set of a plurality of user equipments. An access control policy is set between security groups, to decouple the access control policy from an Internet Protocol (IP) address. In this way, one user equipment may access a network through any terminal and at any place, and access control policies of the user equipment are the same. Therefore, free mobility is implemented.

Currently, when a policy enforcement device stores a device identifier-security group binding table, each entry in the device identifier-security group binding table includes an IP address of a device and information about a corresponding security group. When receiving a data packet sent by a source device, the policy enforcement device first queries a source security group to which the source device belongs, then queries a destination security group to which a destination device belongs, and finally queries a corresponding access rule based on the source security group and the destination security group. That is, table lookup is required for three times.

However, a large enterprise has a large quantity of interconnections, for example, an enterprise with more than 200 thousand employees, 1.6 million employees, or 2.2 million employees, and a large quantity of Internet of things (IoT) devices. The policy enforcement device needs to maintain a device identifier-security group binding table having millions of entries, causing a heavy burden on the policy enforcement device. If the burden on the policy enforcement device exceeds a limit, service quality is affected, causing poor experience of the user equipment.

SUMMARY

Embodiments of this disclosure provide an access control method and a related device, to perform access control on a data packet based on a security group.

A first aspect of this disclosure provides an access control method. The method includes:

A policy enforcement device receives a first data packet sent by a source device. The first data packet carries information about a source security group and information about a destination security group, where the source security group is a security group to which the source device belongs, and the destination security group is a security group to which a destination device of the first data packet belongs. Therefore, the policy enforcement device may determine a corresponding access rule based on the information about the source security group and the information about the destination security group. If the access rule is allowing, the policy enforcement device sends the first data packet to the destination device. Therefore, the policy enforcement device needs to perform table lookup only once without performing table lookup for three times, so that efficiency is greatly improved. In addition, the policy enforcement device does not need to store a device identifier-security group binding table having a large quantity of entries, so that storage pressure on the policy enforcement device is also reduced.

In some feasible implementations, the first data packet is an Internet Protocol version 6 (IPv6) packet, so that an extension header of the first data packet may carry the information about the source security group and the information about the destination security group.

In some feasible implementations, the policy enforcement device receives an access control policy sent by a controller, where the access control policy includes the information about the source security group, the information about the destination security group, and the corresponding access rule, so that the policy enforcement device may perform access control on a data packet based on the access control policy delivered by the controller.

In some feasible implementations, if the access rule is denying, the policy enforcement device discards the first data packet, so that access control performed by the source device on the destination device is implemented.

In some feasible implementations, the policy enforcement device sends the first data packet to a destination authentication device, so that the destination authentication device forwards the first data packet to the destination device, and a destination authentication device can verify the source security group in the first data packet.

A second aspect of this disclosure provides an access control method. The method includes:

A source device obtains information about a security group to which the source device belongs, to obtain information about a source security group, then obtains information about a security group to which a destination device of a first data packet belongs, to obtain information about a destination security group, and finally sends the first data packet to a policy enforcement device. The first data packet carries the information about the source security group and the information about the destination security group. Therefore, the policy enforcement device may determine a corresponding access rule based on the information about the source security group and the information about the destination security group. If the access rule is allowing, the policy enforcement device sends the first data packet to the destination device. Therefore, the policy enforcement device needs to perform table lookup only once without performing table lookup for three times, so that efficiency is greatly improved. In addition, the policy enforcement device does not need to store a device identifier-security group binding table having a large quantity of entries, so that storage pressure on the policy enforcement device is also reduced.

In some feasible implementations, the first data packet is an IPv6 packet, so that an extension header of the first data packet may carry the information about the source security group and the information about the destination security group.

In some feasible implementations, the source device sends an authentication request to a source authentication device, where the authentication request carries a user identifier of the source device, and then receives the information that is about the source security group and that is sent by the source authentication device, so that the source authentication device can authenticate the source device.

In some feasible implementations, the source device receives the information that is about the source security group and that is sent by the source authentication device, so that the source device can obtain the information about the source security group.

In some feasible implementations, the source device sends a security group query request to a controller, where the security group query request carries an IP address and/or a user identifier of the destination device, and receives the information that is about the destination security group and that is sent by the controller, so that the source device can obtain the information about the source security group.

In some feasible implementations, if the destination device is a server, the source device sends a security group query request to a Domain Name System (DNS) server, where the security group query request carries an IP address, a domain name, and/or a user identifier of the destination device, and then receives the information that is about the destination security group and that is sent by the controller, so that the source device can obtain the information about the source security group.

In some feasible implementations, the source device receives a second data packet sent by the destination device, where the second data packet carries information about the destination security group to which the destination device belongs, so that the source device can obtain the information about the source security group.

In some feasible implementations, the source device sends the first data packet to the source authentication device, so that the source authentication device verifies whether the source security group is the security group to which the source device belongs. If the source security group is not the security group to which the source device belongs, the source device receives a first verification error message sent by the source authentication device. If the source security group is the security group to which the source device belongs, the source authentication device sends the first data packet to the policy enforcement device, so that the source security group is verified.

In some feasible implementations, if the destination security group is not the security group to which the destination device belongs, the source device receives a second verification error message, to notify the source device to update the information about the destination security group.

In some feasible implementations, the source device sends a security group update request to the controller, and receives information that is about a new security group and that is sent by the controller, so that the source device actively changes the security group to which the source device belongs.

A third aspect of this disclosure provides an access control method. The method includes:

A source authentication device receives a first data packet sent by a source device, where the first data packet carries information about a source security group, and then determines whether the source security group is a security group to which the source device belongs. If the source security group is the security group to which the source device belongs, the source authentication device sends the first data packet to a policy enforcement device, so that the source security group to which the source device belongs is authenticated. Therefore, a case in which the source device forges the source security group to obtain an access right to the destination device is avoided.

In some feasible implementations, if the source authentication device determines that the source security group is not the security group to which the source device belongs, the source authentication device sends a first verification error message to the source device, to notify the source device that the source security group to which the source device belongs is incorrect, so that the source device can update the information about the security group to which the source device belongs.

In some feasible implementations, the source authentication device receives an authentication request sent by the source device, where the authentication request carries a user identifier of the source device, then sends the authentication request to a controller, receives the information that is about the source security group and that is sent by the controller, and finally sends the information about the source security group to the source device, so that the source authentication device is authenticated.

A fourth aspect of this disclosure provides an access control method. The method includes:

A destination authentication device receives a first data packet sent by a source device. The first data packet carries information about a destination security group. Therefore, the destination authentication device may determine whether the destination security group is a security group to which the destination device belongs. If the destination security group is the security group to which the destination device belongs, the destination authentication device sends the first data packet to the destination device, so that the destination security group to which the first data packet belongs is verified.

In some feasible implementations, if the destination security group is not the security group to which the destination device belongs, the destination authentication device discards the first data packet, so that an access control effect is achieved.

In some feasible implementations, if the destination security group is not the security group to which the destination device belongs, the destination authentication device sends a second verification error message to the destination device, to notify that the destination security group is incorrect.

A fifth aspect of this disclosure provides a policy enforcement device, and the policy enforcement device is configured to perform the method according to the implementations of the first aspect.

A sixth aspect of this disclosure provides user equipment. The user equipment is used as a source device, and configured to perform the method according to the implementations of the second aspect.

A seventh aspect of this disclosure provides an authentication device. The authentication device is used as a source authentication device, and is configured to perform the method according to the implementations of the third aspect.

An eighth aspect of this disclosure provides an authentication device. The authentication device is used as a destination authentication device, and configured to perform the method according to the implementations of the fourth aspect.

A ninth aspect of this disclosure provides a communication system. The communication system includes a policy enforcement device, user equipment, a source authentication device, and a destination authentication device.

The policy enforcement device is configured to perform any method performed by the policy enforcement device in the first aspect; the user equipment is configured to be used as a source device to perform any method performed by the source device in the second aspect; the source authentication device is configured to perform any method performed by the source authentication device in the third aspect; and the destination authentication device is configured to perform any method performed by the destination authentication device in the fourth aspect.

A tenth aspect of this disclosure provides a computer-readable storage medium. The computer-readable storage medium stores instructions. When the instructions are run on a computer, the computer is enabled to perform the method according to any one of the first aspect, the second aspect, the third aspect, or the fourth aspect.

An eleventh aspect of this disclosure provides a computer program product. The computer program product includes computer-executable instructions. The computer-executable instructions are stored in a computer-readable storage medium. At least one processor of a device may read the computer-executable instructions from the computer-readable storage medium. The at least one processor executes the computer-executable instructions to enable the device to perform the method according to any one of the possible implementations in the first aspect to the fourth aspect.

A twelfth aspect of this disclosure provides a communication apparatus, and the communication apparatus may include at least one processor, a memory, and a communication interface. The at least one processor is coupled to the memory and the communication interface. The memory is configured to store instructions, the at least one processor is configured to execute the instructions, and the communication interface is configured to communicate with another device under control of the at least one processor. When the instructions are executed by the at least one processor, the at least one processor is enabled to perform the method according to any possible implementation in the first aspect to the fourth aspect.

A thirteenth aspect of this disclosure provides a chip system. The chip system includes a processor and is configured to support the processor to implement functions according to the first aspect or any one of the possible implementations of the first aspect.

In a possible design, the chip system may further include a memory, and the memory is configured to store necessary program instructions and data. The chip system may include a chip, or may include the chip and another discrete device.

For technical effects brought by the ninth aspect to thirteenth aspect or any one of the possible implementations in the ninth aspect to the thirteenth aspect, refer to technical effects brought by the first aspect or the different possible implementations in the first aspect. Details are not described herein again.

It can be learned from the foregoing technical solutions that embodiments of this disclosure have the following advantages:

The policy enforcement device receives the first data packet sent by the source device. The first data packet carries the information about the source security group and the information about the destination security group. Therefore, the policy enforcement device may determine the corresponding access rule based on the information about the source security group and the information about the destination security group. If the access rule is allowing, the policy enforcement device sends the first data packet to the destination device. Therefore, the policy enforcement device needs to perform table lookup only once without performing table lookup for three times, so that efficiency is greatly improved. In addition, the policy enforcement device does not need to store the device identifier-security group binding table having a large quantity of entries, so that storage pressure on the policy enforcement device is also reduced.

DESCRIPTION OF EMBODIMENTS

Embodiments of this disclosure provide an access control method, to perform access control on a data packet based on a security group.

The following describes embodiments of this disclosure with reference to the accompanying drawings.

In the specification, claims, and the accompanying drawings of this disclosure, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
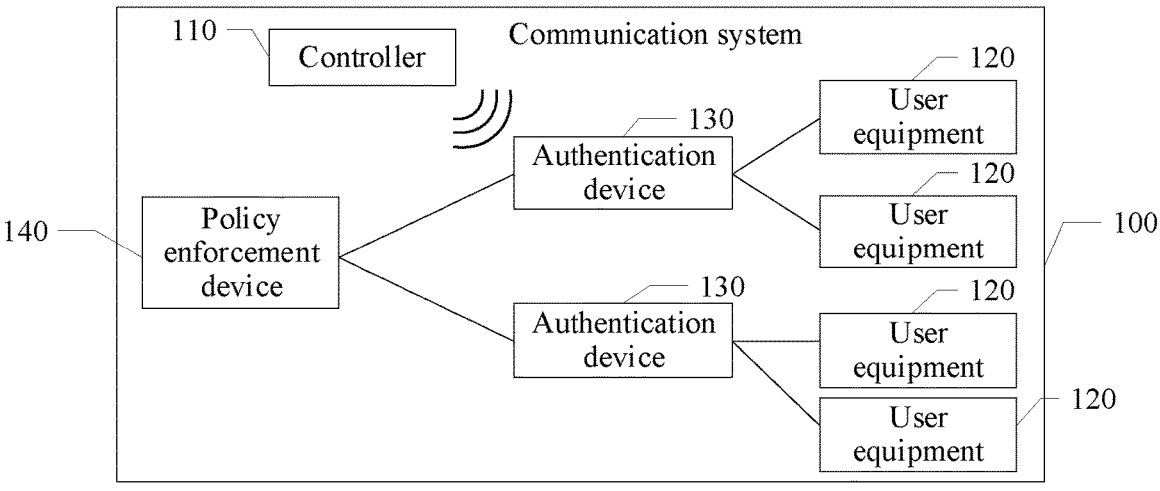
FIG. 1 is a schematic diagram of a composition structure of a communication system according to an embodiment of this disclosure.

FIG. 1 is a schematic diagram of composition structure of a communication system according to an embodiment of this disclosure. The communication system 100 includes a controller 110, user equipment 120, authentication devices 130, and a policy enforcement device 140.

The controller 110 is configured to set an access control policy under control of an administrator. The user equipment 120 is configured to send a data packet to the authentication device 130. The authentication device 130 is configured to authenticate the user equipment 120 based on the data packet. The policy enforcement device 140 is configured to perform access control on the data packet sent by the user equipment 120.

The user equipment 120 may be an IoT device, a mobile terminal (for example, a mobile phone or a tablet computer), a personal computer (PC), a server, and the like. The authentication device 120 may be an access switch, an aggregation switch, a firewall, and the like. The policy enforcement device 140 may be a core switch and an aggregation switch, and the like. The controller 110 may manage the communication system under control of the administrator. In this embodiment of this disclosure, the user equipment 120 that sends the data packets is referred to as a source device, and the user equipment 120 that receives the data packet is referred to as a destination device. In addition, the authentication device 120 that authenticates the source device is referred to as a source authentication device, and the authentication device that authenticates the destination device is referred to as a destination authentication device.

A security group is a set of a plurality of user equipments. An access control policy is set between security groups, to decouple the access control policy from an IP address. In this way, one user equipment may access a network through any terminal and at any place, and access control policies of the user equipment are the same. Therefore, free mobility is implemented.

Currently, when a policy enforcement device stores a device identifier-security group binding table, each entry in the device identifier-security group binding table includes an IP address of a device and information about a corresponding security group. When receiving a data packet sent by a source device, the policy enforcement device first queries a source security group to which the source device belongs, then queries a destination security group to which a destination device belongs, and finally queries a corresponding access rule based on the source security group and the destination security group. That is, table lookup is required for three times.

However, a large enterprise has a large quantity of interconnections, for example, an enterprise with more than 200 thousand employees, 1.6 million employees, or 2.2 million employees, and a large quantity of IoT devices. The policy enforcement device needs to maintain a device identifier-security group binding table having millions of entries, causing a heavy burden on the policy enforcement device. If the burden on the policy enforcement device exceeds the limit, service quality is affected, causing poor experience of the user equipment.

Therefore, this disclosure provides an access control method, to perform access control on a data packet based on a security group. This includes five parts, which are separately described in the following:

First part: A controller defines a security group and deploys an access control policy between security groups.

Figure 2A:
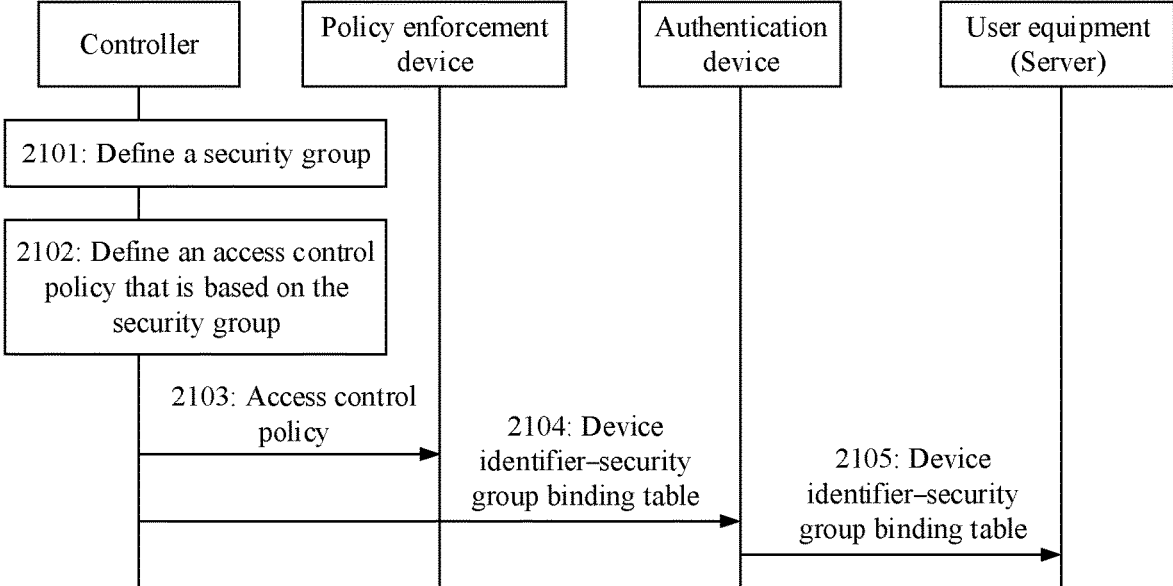
FIG. 2A is a schematic diagram of an embodiment of a first part in an access control method according to this disclosure.

Refer to FIG. 2A. The first part in the access control method in this disclosure includes the following steps.

2101: A controller defines a security group.

In this embodiment of this disclosure, the security group is a set of user equipment, and the security group may be named as required, for example, a research and development (R&D) group (group_R&D) or a marketing group (group_MKT). Defining the security group is to determine the specific user equipment included in the security group. In some feasible implementations, the user equipment in the security group is represented by using a user identifier. In some feasible implementations, the user identifier may be an account, and may be represented by a number, a character string, a Chinese character, a foreign character (for example, English, Japanese, and Russian), or a combination of the foregoing various types. This is not limited herein.

For example, as shown in Table 1-1:

TABLE 1-1

| User identifier | Security group |
|---|---|
| A1 | R&D group (group_R&D) |
| A2 | R&D group (group_R&D) |
| B3 | Marketing group (group_MKT) |
| B4 | Marketing group (group_MKT) |

As shown in Table 1-1, there are two security groups: the R&D group (group_R&D) and the marketing group (group_MKT). The user equipment of the R&D group (group_R&D) includes A1 and A2, and the user equipment of the marketing group (group_MKT) includes B3 and B4. A1, A2, B3, and B4 are all client devices.

It should be noted that the user identifier is a unique identifier of a user, and any two different user identifiers respectively represent two different users. Therefore, the user may log in to any device by using the user identifier, and the any device is considered as the same user equipment.

It should be noted that the security group may be a source security group, or a destination security group. A source of a data packet is a source device, and a security group to which the source device belongs is a source security group. A destination of a data packet is a destination device, and a security group to which the destination device belongs is a destination security group.

In some feasible implementations, a controller may define the security group in the following two planning manners.

In this embodiment of this disclosure, the user equipment may be a client device, or a server. The client device usually defines, in Manner 1, a security group to which the client device belongs, and the server usually defines, in Manner 2, a security group to which the server belongs.

Manner 1: Dynamic Planning.

In some feasible implementations, an enterprise may dynamically plan, based on a user management requirement of the enterprise, a security group to which accessed user equipment belongs. For example, on a working day, a security group to which the user equipment (referred to as A1 in the following) whose user identifier is A1 belongs is an R&D group, and on a non-working day, a security group to which A1 belongs is a visitor group. For another example, in an enterprise campus, a security group to which A1 belongs is an R&D group, and outside the enterprise campus, a security group to which A1 belongs is a marketing group.

Manner 2: Static Planning.

It should be noted that the user equipment on which static planning is performed is usually the server. An administrator may allocate a device identifier (to be specific, an IP address) to the server, and store the device identifier (IP address) of the server and a corresponding security group in a device identifier-security group binding.

For example, Table 1-2 is a device identifier-security group binding table.

TABLE 1-2

| Device identifier | User identifier | Security group |
|---|---|---|
| 10.1.5.3 | C1 | Business group (group_BSN) |
| 10.1.6.3 | C2 | Business group (group_BSN) |
| 10.1.7.3 | D3 | Employee group (group_EPL) |
| 10.1.8.3 | D4 | Employee group (group_EPL) |

It can be learned from Table 1-2 that there are two security groups: the business group (group_BSN) and the employee group (group_EPL). The user equipment of the business group (group_BSN) includes C1 and C2, and the user equipment of the employee group (group_EPL) includes D3 and D4. Access control policies of the business group and the employee group are different. For example, a server of the employee group (group_EPL) allows only internal employees to access, for example, the user equipment of the R&D group (group_R&D) and the marketing group (group_MKT), while a server of the business group (group_BSN) allows all user equipment to access, including a visitor.

2102: The controller defines an access control policy that is based on the security group.

In some feasible implementations, the access control policy includes a plurality of entries, and each entry includes a source security group, a destination security group, and a corresponding access rule. In some possible implementations, the access rule may be allowing and denying, or may be full access, partial access, rate-limited access, time-limited access, or the like. This is not limited herein. It should be noted that the controller may define the access control policy under an operation of the administrator, or may define the access control policy by setting a preset access rule. This is not limited herein.

For example, the security group based on the access control policy may be shown in Table 2:

TABLE 2

| Source security group | Destination security group | Access rule |
|---|---|---|
| R&D group (group_R&D) | Marketing group (group_MKT) | Denying |
| R&D group (group_R&D) | Employee group (group_EPL) | Allowing |
| Marketing group (group_MKT) | R&D group (group_R&D) | Denying |
| Marketing group (group_MKT) | Employee group (group_EPL) | Allowing |
| Employee group (group_EPL) | R&D group (group_R&D) | Allowing |
| Employee group (group_EPL) | Marketing group (group_MKT) | Allowing |

As shown in Table 2, the R&D group (group_R&D) and the marketing group (group_MKT) deny access to each other, but the employee group (group_EPL) may access each other with the R&D group (group_R&D) and the marketing group (group_MKT) separately.

2103: The controller sends the access control policy to a policy enforcement device.

In this embodiment of this disclosure, after defining the access control policy, the controller may send the access control policy to the policy enforcement device. After receiving the access control policy, the policy enforcement device locally deploys the access control policy.

2104: The controller sends the device identifier-security group binding table to an authentication device.

In some feasible implementations, the server does not need to be authenticated, and therefore, after defining the device identifier-security group binding table, the controller sends the device identifier-security group binding table to an authentication device corresponding to the server, so that the authentication device stores the device identifier-security group binding table.

2105: The authentication device sends the device identifier-security group binding table to the server.

In some feasible implementations, after receiving the device identifier-security group binding table sent by the controller, the authentication device locally stores the device identifier-security group binding table, and forwards related entries in the device identifier-security group binding table to a corresponding server in the device identifier-security group binding table, so that the server locally stores the entries. For example, the authentication device sends, to a server whose user identifier is C1 in the employee group (group_EPL), entries that are shown in Table 3 below and that are of the device identifier-security group binding table:

TABLE 3

| Device identifier (IP address) | User identifier | Security group |
|---|---|---|
| 10.1.5.3 | C1 | Business group (group_BSN) |

According to the steps 2101 to 2105 in the first part, the controller defines the security group and deploys the access control policy between the security groups, and sends the device identifier-security group binding table to a related authentication device, and the authentication device sends corresponding entries to the server.

Second part: A client device initiates authentication, to obtain a security group to which the client device belongs.

All client devices need to pass authentication on a controller. In the second part of this embodiment of this disclosure, an authentication process of the client device is described. In some possible implementations, the client device may initiate authentication when preparing to send a data packet, or may initiate authentication when accessing a network. This is not limited herein.

Figure 2B:
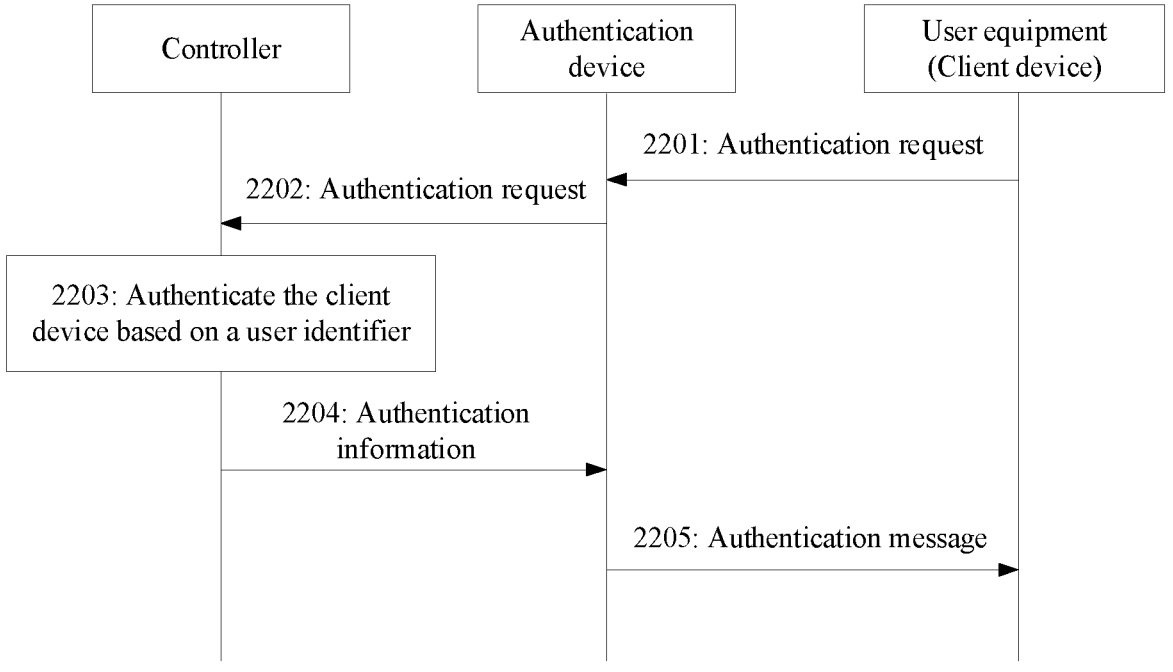
FIG. 2B is a schematic diagram of an embodiment of a second part in an access control method according to this disclosure.

Refer to FIG. 2B. The second part in the access control method in this disclosure includes the following steps.

2201: The client device sends an authentication request to an authentication device, and the authentication request carries a user identifier.

In this embodiment of this disclosure, user equipment may initiate authentication, for example, portal authentication or 802.1X authentication, to the authentication device by operating the client device. The authentication request may carry the user identifier, and the user identifier may be an account. Then, the client device sends the authentication request to the authentication device, and the authentication request carries the user identifier. In some feasible implementations, the authentication request may further carry a password or a verification code. This is not limited herein.

2202: The authentication device sends the authentication request of the client device to the controller, and the authentication request includes the user identifier.

In this embodiment of this disclosure, after the authentication device receives the authentication request sent by the client device, the authentication device sends the authentication request related to the client device to the controller, and the authentication request includes the user identifier of the client device, to request the controller to authenticate the client device.

2203: The controller authenticates the client device based on the user identifier.

In this embodiment of this disclosure, the controller verifies an identity of the user equipment based on the user identifier. If the user identifier passes authentication, an IP address is allocated to the client device as a device identifier, and a security group to which the client device belongs is determined based on Table 1-1, and is stored in a local device identifier-security group binding table. For example, if the user identifier is A1, it is determined, based on Table 1-1, that the security group to which the client device belongs is an R&D group (group_R&D). In some possible implementations, the IP address of the client device may be an Internet Protocol version 4 (IPv4) address, or an IPv6 address. This is not limited herein.

According to the foregoing steps, the controller determines the security group to which the client device belongs and the IP address, which are shown in Table 4-1:

TABLE 4-1

| IP address (Device identifier) | User identifier | Security group |
| --- | --- | --- |
| 10.1.1.3 | A1 | R&D group (group_R&D) |

In addition, content in Table 4-1 is stored as entries in the local device identifier-security group binding table. For example, Table 4-2 is obtained:

TABLE 4-2

| IP address (Device identifier) | User identifier | Security group |
| --- | --- | --- |
| 10.1.1.3 | A1 | R&D group (group_R&D) |
| 10.1.2.3 | A2 | R&D group (group_R&D) |
| 10.1.3.3 | B3 | Marketing group (group_MKT) |
| 10.1.4.3 | B4 | Marketing group (group_MKT) |
| 10.1.5.3 | C1 | Business group (group_BSN) |
| 10.1.6.3 | C2 | Business group (group_BSN) |
| 10.1.7.3 | D3 | Employee group (group_EPL) |
| 10.1.8.3 | D4 | Employee group (group_EPL) |

2204: The controller sends authentication information to the authentication device.

In this embodiment of this disclosure, after completing authentication on the client device, the controller sends the authentication information to the authentication device, and the authentication information includes a check result. The check result is used to indicate whether authentication on the source device succeeds. If the check result indicates that the authentication succeeds, the authentication information further includes entries that are shown in Table 4-2 and that are related to the device identifier-security group binding table. For example, if the authentication device is used to be connected to client devices whose user identifiers are A1, A2, B3, and B4, related entries that are sent to the authentication device and that are in the device identifier-security group binding table are shown in Table 4-3:

TABLE 4-3

| IP address (Device identifier) | User identifier | Security group |
| --- | --- | --- |
| 10.1.1.3 | A1 | R&D group (group_R&D) |
| 10.1.2.3 | A2 | R&D group (group_R&D) |
| 10.1.3.3 | B3 | Marketing group (group_MKT) |
| 10.1.4.3 | B4 | Marketing group (group_MKT) |

2205: The authentication device sends an authentication message to the client device.

In this embodiment of this disclosure, after receiving the authentication information sent by the controller, if the check result is that the authentication succeeds, the authentication device locally stores related entries that are shown in Table 4-3 and that are in the device identifier-security group binding table.

Then, the authentication device sends entries that are related to the client device and that are in the device identifier-security group binding table to the client device. For example, the authentication device sends, to the client device whose user identifier is A1, entries shown in Table 4-4:

TABLE 4-4

| IP address (Device identifier) | User identifier | Security group |
| --- | --- | --- |
| 10.1.1.3 | A1 | R&D group (group_R&D) |

After receiving the entries, the client device locally stores one entry of the device identifier-security group binding table that is locally stored.

Third part: A source device update a security group.

Figure 2C:
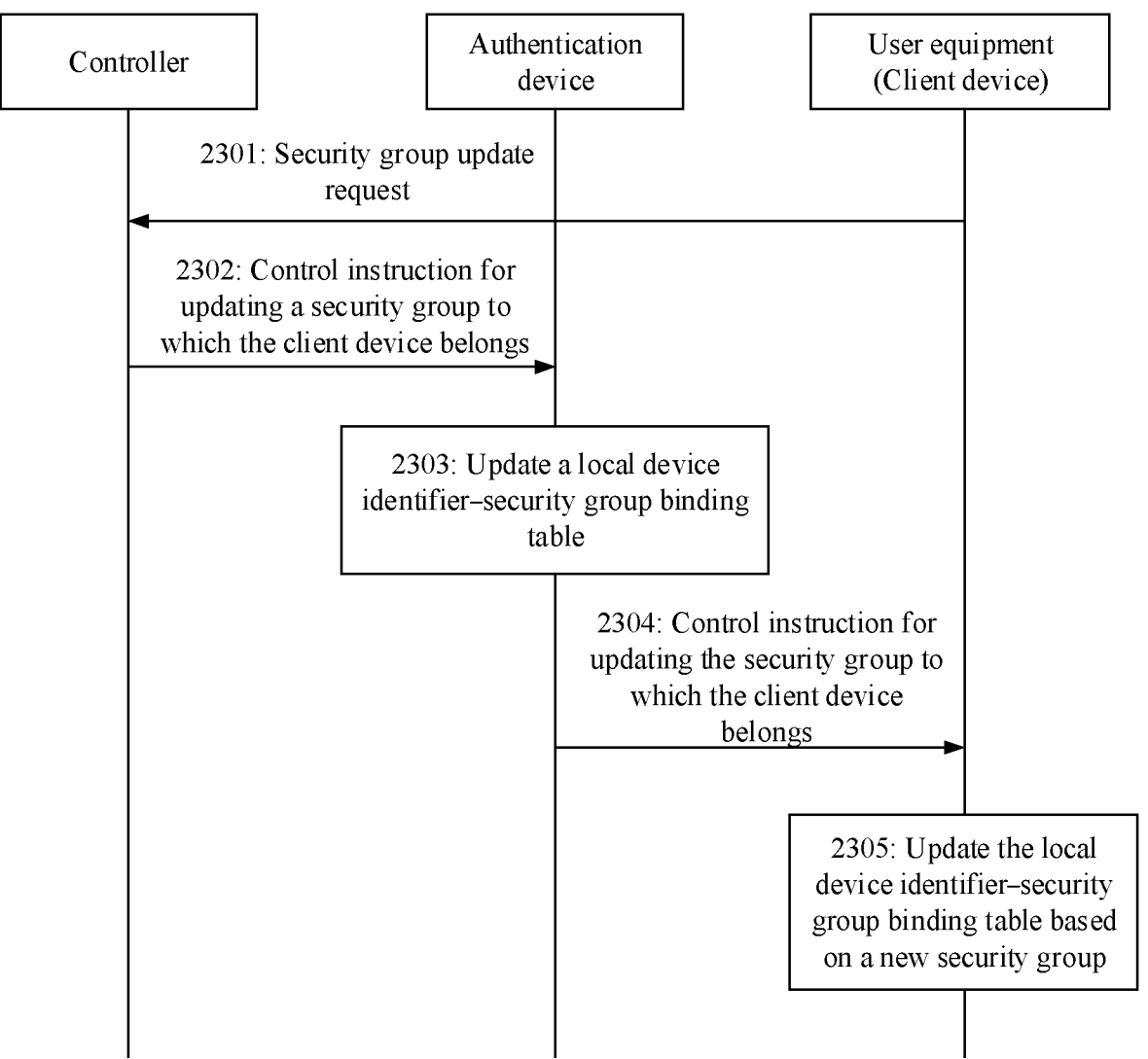
FIG. 2C is a schematic diagram of an embodiment of a third part in an access control method according to this disclosure.

Refer to FIG. 2C. The third part in the access control method in this disclosure includes the following steps.

2301: A client device sends a security group update request to a controller.

In some feasible implementations, the client device may change the security group based on a scenario (a scenario including time, a location, customer application system linkage, or the like). When the client device needs to change the security group, the client device may send the security group update request to the controller. For example, due to position relocation or the like, user equipment whose user identifier is A1 desires to change from the R&D group (group_R&D) to the marketing group (group_MKT). In this case, the security group update request carries information about the marketing group (group_MKT). It should be noted that the step of sending, by the client device, the security group update request to the controller may be implemented under an operation of a user, or may be automatically implemented by the client device based on a requirement. This is not limited herein.

In some feasible implementations, the controller may update, based on the security group update request of the client device, information about a security group to which the client device belongs. For example, the controller determines, based on information about a new security group in the security group update request, whether a change is allowed. In some feasible implementations, whether the information about the new security group is allowed to be changed may be preset. For example, user equipment between the R&D group (group_R&D) and the marketing group (group_MKT) may be freely changed. In some feasible implementations, whether the change is allowed may also need to be approved by management personnel of the new security group. For example, if the new security group is the marketing group (group_MKT), when a client device of the R&D group (group_R&D) desires to be changed to a client device of the marketing group (group_MKT), a leader of the marketing group (group_MKT) needs to approve. This is not limited herein.

For example, the security group to which the client device belongs is changed from the R&D group (group_R&D) to the marketing group (group_MKT), and then the controller continues to use an original IP address for the client device, or the original IP address may be modified to another IP address. This is not limited herein. For example, the controller continues to use the original IP address for the client device, to obtain entries that are shown in Table 5 and that are of the device identifier-security group binding table:

TABLE 5

| IP address (Device identifier) | User identifier | Security group |
|---|---|---|
| 10.1.1.3 | A1 | Marketing group (group_MKT) |

2302: The controller sends, to an authentication device, a control instruction for updating the security group to which the client device belongs, where the control instruction includes the information about the new security group.

In this embodiment of this disclosure, the controller sends, to the authentication device, the control instruction for updating the security group to which the client device belongs. The control instruction includes the information about the new security group. For example, the information about the new security group includes content in Table 6.

TABLE 6

| IP address | User identifier | Security group |
|---|---|---|
| 10.1.1.3 | A1 | Undefined group (group_undefined) |

Table 7 shows an access control policy of the controller for the undefined group (group_undefined) to which the client device belongs:

TABLE 7

| Source security group | Destination security group | Access control policy |
|---|---|---|
| Undefined group (group_undefined) | R&D group (group_R&D) | Denying |
| Undefined group (group_undefined) | Marketing group (group_MKT) | Denying |
| Undefined group (group_undefined) | Employee group (group_EPL) | Denying |
| Undefined group (group_undefined) | Business group (group_BSN) | Denying |

In some feasible implementations, the controller may alternatively actively change, based on a requirement, the security group to which the source device belongs. In this case, the controller may notify the authentication device to update the security group corresponding to the client device. For example, when discovering an abnormal terminal having an attack or intrusion behavior in a network, the controller may immediately switch a security group to which the abnormal terminal belongs, and change a right of the abnormal terminal.

For example, the controller finds that the user equipment whose user identifier is A1 is abnormal, and then the controller changes, from the R&D group (group_R&D) to the undefined group (group_undefined), the security group to which the client device whose user identifier is A1 belongs, and an access control policy corresponding to the undefined group (group_undefined) is that access to all security groups is denied. For example, the client device maintains the original IP address, as shown in Table 6.

2303: The authentication device updates, based on the new security group, information that is in the local device identifier-security group binding table and that is related to the security group to which the client device belongs.

For example, the authentication device originally stores the security group that is in Table 4-3 and that is related to the client device. Now the security group corresponding to the user identifier A1 may be changed to the security group corresponding to the user identifier A1 in Table 6, to be specific, the R&D group (group_R&D) is changed to the undefined group (group_undefined). It should be noted that, in the device identifier-security group binding table, only the security group related to the client device is updated to a new security group, and a security group other than the source device is not modified.

2304: The authentication device sends, to the client device, the control instruction for updating the security group to which the client device belongs, where the control instruction includes the new security group.

In this embodiment of this disclosure, the source authentication device may send, to the client device, the control instruction for updating the security group to which the client device belongs, and the control instruction includes the new security group.

2305: The client device updates the local device identifier-security group binding table based on the new security group.

For example, the source device changes the security group in a saved device identifier-security group binding table to the new security group. Refer to Table 6.

Fourth part: a source device obtains information about a security group to which a destination device belongs.

In this embodiment of this disclosure, before sending a data packet to the destination device, the source device needs to first obtain the information about the security group to which the destination device belongs, to be specific, a destination security group. Therefore, this disclosure provides three methods to implement that the source device obtains information about the destination security group. The following separately describes the three methods:

Method a: A source device obtains information about a destination security group by using a controller.

Figure 2D:
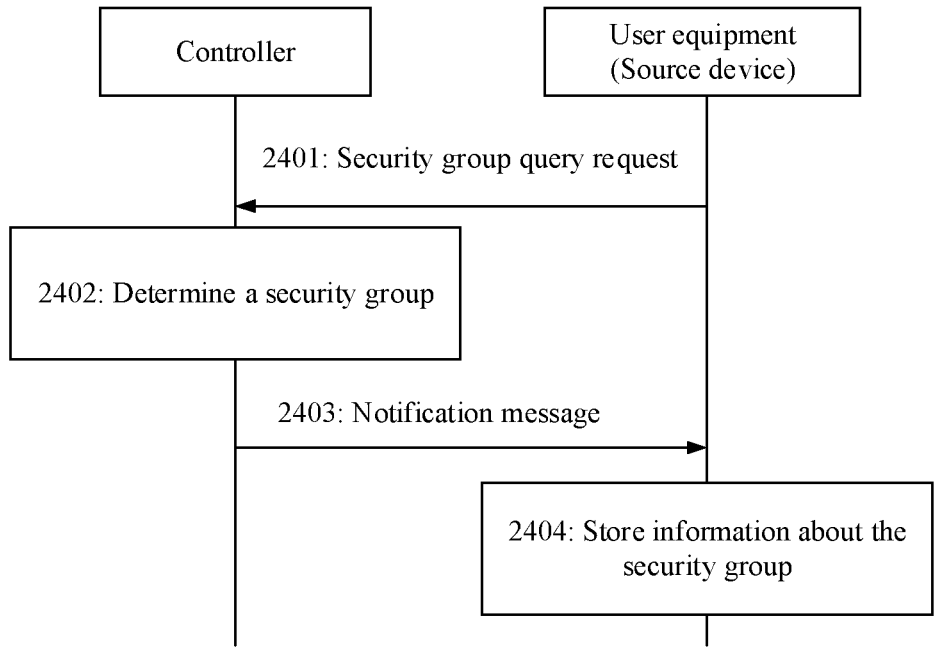
FIG. 2D is a schematic diagram of an embodiment of a method a of a fourth part in an access control method according to this disclosure.

Refer to FIG. 2D. The method a of the fourth part in the access control method in this disclosure includes the following steps.

2401: The source device sends a security group query request to the controller, and the security group query request carries a device identifier (IP address) of a destination device.

In this embodiment of this disclosure, the source device may obtain the device identifier (to be specific, the IP address) of the destination device. This is in other technologies, and details are not described herein again. In some feasible implementations, when the destination device is a server, the source device may send a query request for the IP address of the destination device to a DNS server. The query request carries a domain name of the destination device, to be specific, a device identifier (IP address) of the server may be obtained through query.

2402: The controller determines the destination security group in a device identifier-security group binding table based on the device identifier of the destination device.

For example, the device identifier is 10.1.7.3. According to Table 1-2, the user identifier of the destination device is D3, and a security group to which the destination device belongs is the employee group (group_EPL). Table 2 shows the access control policy related to the employee group (group_EPL).

2403: The controller sends a notification message to the source device, and the notification message includes the information about the security group to which the destination device belongs.

For example, if the controller obtains, through query, that the security group to which the destination device whose user identifier is D3 belongs is the employee group (group_EPL), the controller sends the notification message to the source device. The notification message indicates the information about the security group to which the destination device belongs, and may include a name of the security group to which the destination device belongs, to be specific, the employee group (group_EPL).

2404: The source device stores the information about the security group in the local device identifier-security group binding table.

In this embodiment of this disclosure, after receiving the information about the security group to which the destination device belongs, the source device may store the information about the security group in the local device identifier-security group binding table, for example, store the name of the security group and the device identifier (IP address) of the destination device, to obtain a device identifier-security group binding table shown in Table 8.

TABLE 8

| IP address | User identifier | Security group |
|---|---|---|
| 10.1.1.3 | A1 | R&D group (group_R&D) |
| 10.1.7.3 | D3 | Employee group (group_EPL) |

Method b: When a destination device is a server, a source device may obtain information about a security group to which a destination device belongs by using a DNS server.

Figure 2E:
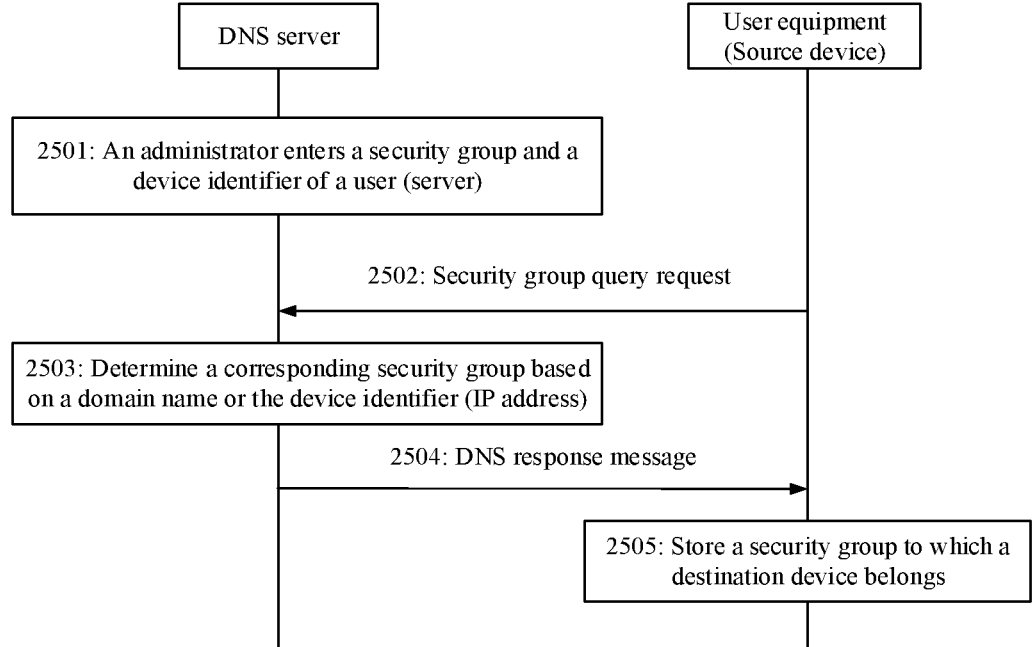
FIG. 2E is a schematic diagram of an embodiment of a method b of a fourth part in an access control method according to this disclosure.

Refer to FIG. 2E. The method b of the fourth part in the access control method in this disclosure includes the following steps.

2501: An administrator enters a DNS record in the DNS server, and the DNS record includes the security group to which the server belongs and the device identifier (IP address).

In this embodiment of this disclosure, after defining the security group to which the server belongs as the server, the administrator may enter the DNS record in the DNS server. For example, the DNS record is entries shown in Table 1-2.

2502: The source device sends a security group query request to the DNS server, and the security group query request carries a domain name or a device identifier (IP address) of the destination device.

For example, the domain name carried in the query request sent by the source device is https://developer.huawei.com/cn/, and the device identifier (IP address) of the destination device is 10.1.3.3.

2503: The DNS server determines a corresponding security group based on the domain name or the device identifier (IP address).

In this embodiment of this disclosure, after receiving the security group query request, the DNS server queries the device identifier-security group binding table shown in Table 1-2 based on the device identifier (IP address) in the security group query request, to obtain the security group corresponding to the device identifier (IP address). For example, the device identifier (IP address) of the destination device is 10.1.3.3, and then the device identifier-security group binding table shown in Table 1-2 may be queried, to obtain that the corresponding security group is the business group (group_BSN).

2504: The DNS server sends a DNS response message to the source device, and the DNS response message carries the security group to which the destination device belongs.

In this embodiment of this disclosure, after determining the security group to which the destination device belongs, the DNS server sends the DNS response message to the source device, and the DNS response message carries the information about the security group to which the destination device belongs.

2505: The source device locally stores the security group to which the destination device belongs.

In this embodiment of this disclosure, when the source device receives the information about the security group to which the destination device belongs, the information is stored as an entry in the local device identifier-security group binding table, to obtain a locally stored device identifier-security group binding table shown in Table 9:

TABLE 9

| IP address | User identifier | Security group |
|---|---|---|
| 10.1.1.3 | A1 | R&D group (group_R&D) |
| 10.1.3.3 | B3 | Marketing group (group_MKT) |
| 10.1.5.3 | C1 | Business group (group_BSN) |

Method c: A source device obtains information about a destination security group to which a destination device belongs by using a received data packet.

Figure 2F:
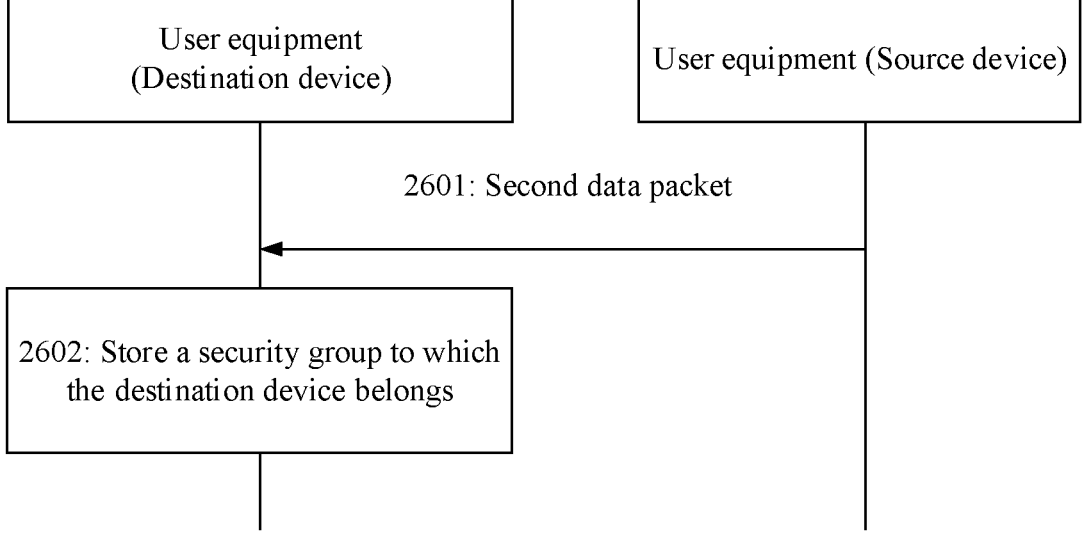
FIG. 2F is a schematic diagram of an embodiment of a method c of a fourth part in an access control method according to this disclosure.

Refer to FIG. 2F. The method c of the fourth part in the access control method in this disclosure includes the following steps.

2601: The source device receives a second data packet sent by the destination device, and the second data packet includes the security group to which the destination device belongs.

In some feasible implementations, before sending a first data packet to the destination device, the source device may first receive the second data packet sent by the destination device. The second data packet carries a device identifier (IP address) of the destination device and the information about the security group to which the destination device belongs. For example, the device identifier (IP address) of the destination device is 10.1.1.3, and the security group to which the destination device belongs is an R&D group (group_R&D) shown in Table 1-2, to be specific, a client device whose user identifier is A1.

2602: The source device stores the security group to which the destination device belongs in a local device identifier-security group binding table.

After receiving the data packet, the source device extracts the device identifier (IP address) of the destination device and the information about the security group to which the destination device belongs from the data packet, and stores the device identifier (IP address) and the information about the security group in the local device identifier-security group binding table.

Fifth part: A source device sends a first data packet to a destination device.

Figure 2G:
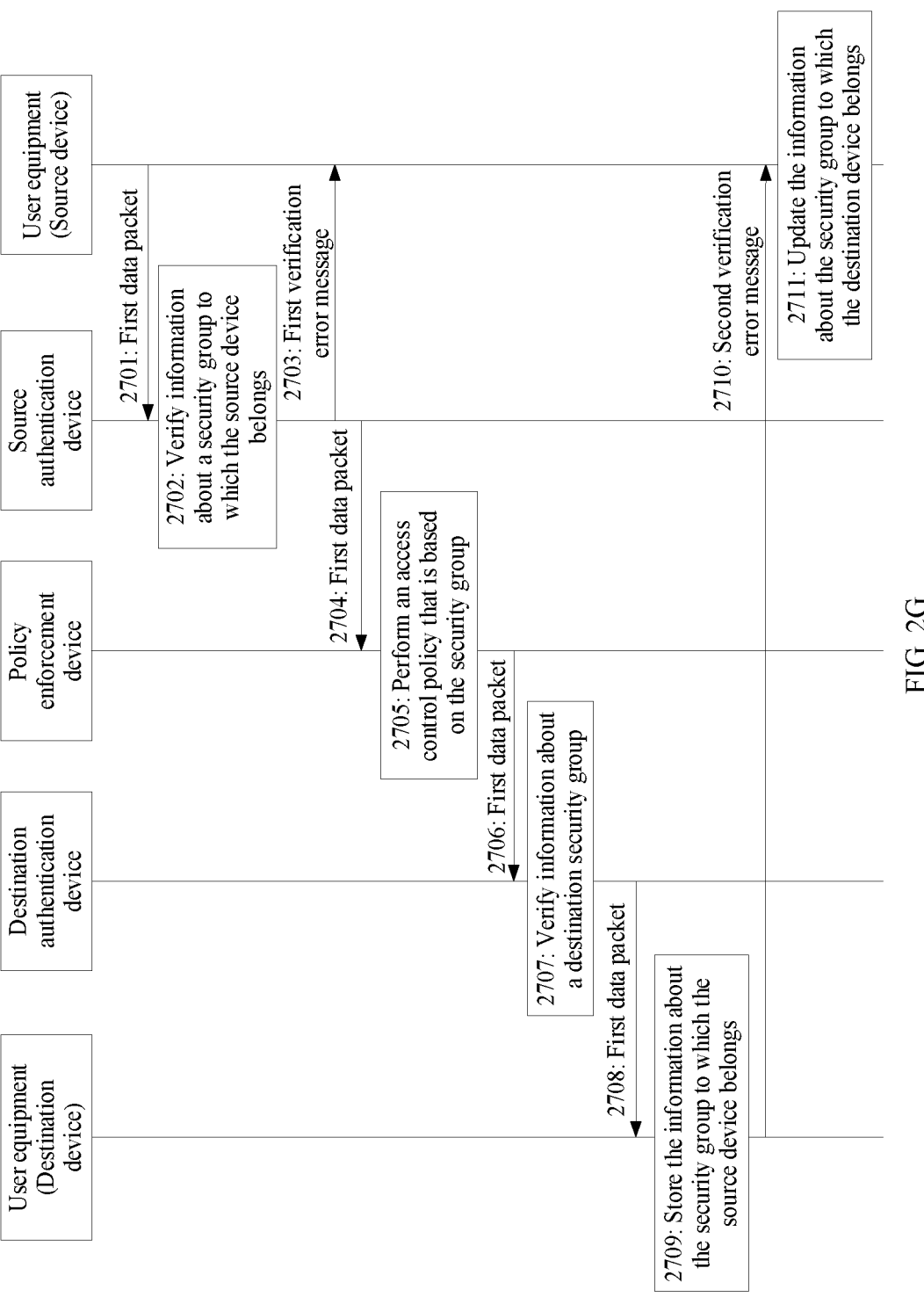
FIG. 2G is a schematic diagram of an embodiment of a fifth part in an access control method according to this disclosure.

Refer to FIG. 2G. The fifth part in the access control method in this disclosure includes the following steps.

2701: The source device sends the first data packet to a source authentication device, and the first data packet carries a device identifier (IP address) of the source device, information about a source security group, a device identifier (IP address) of the destination device, and information about a destination security group.

In this embodiment of this disclosure, the source device needs to send the first data packet to the destination device, send the first data packet to the source authentication device, and carry the device identifier (IP address) of the source device, the information about the source security group, the device identifier (IP address) of the destination device, and the information about the destination security group in the first data packet.

In some feasible implementations, the first data packet is an IPv6 packet, and an extension header of the first data packet carries the device identifier (IP address) of the source device, the information about the source security group, the device identifier (IP address) of the destination device, and the information about the destination security group.

For example, based on IPv6, the first data packet sent by the source device may be shown in Table 10:

TABLE 10

| IP address of the destination device: 10.1.5.3 | IP address of the source device: 10.1.1.3 |
| --- | --- |
| Destination security group: business group (group_BSN) | Source security group: R&D group (group_R&D) |
| Payload (payload) | |

It can be learned from Table 10 that, a user identifier of the source device is A1, the IP address of the source device is 10.1.1.3, and the source security group is the R&D group (group_R&D); and a user identifier of the destination device is C1, the IP address of the destination device is 10.1.5.3, and the destination security group is the business group (group_BSN).

In some feasible implementations, the IP address of the source device/the destination device and the information about the source security group/the destination security group may be defined in the payload, or in another field. This is not limited herein.

2702: The source authentication device verifies the information about the source security group.

In this embodiment of this disclosure, the source authentication device may verify whether a security group indicated by the information about the source security group in the first data packet is the security group to which the source device belongs. The source authentication device extracts the information about the source security group and the device identifier (to be specific, the IP address) of the source device from the first data packet, and then queries, based on a locally stored device identifier-security group binding table, a security group corresponding to the device identifier (IP address). If the two are the same, the verification succeeds; otherwise, the verification fails.

For example, Table 4-2 shows the device identifier-security group binding table stored in the source authentication device, and the IP address of the source device is 10.1.1.3. Therefore, it may be determined that a name of the corresponding security group is group_R&D. Assuming that a name of the security group to which the source device belongs is group_R&D, the verification succeeds. To be specific, the source security group is the security group to which the source device belongs. Otherwise, the verification fails.

In this embodiment of this disclosure, if the verification succeeds, step 2704 is performed; otherwise, step 2703 is performed.

2703: The source authentication device sends a first verification error message to the source device.

In this embodiment of this disclosure, when the source authentication device determines that the source security group in the first data packet is not the security group to which the source device belongs, it is possible that the source device forges the source security group to obtain an access right for the destination device. In this case, the first data packet may be discarded, and the first verification error message may be sent to the source authentication device.

2704: The source authentication device sends the first data packet to a policy enforcement device.

In this embodiment of this disclosure, after the verification succeeds, the source authentication device forwards the first data packet to the policy enforcement device.

2705: The policy enforcement device performs an access control policy that is based on the security group on the first data packet.

In this embodiment of this disclosure, when receiving the first data packet, the policy enforcement device extracts, from the first data packet, the source security group to which the source device belongs and the destination security group to which the destination device belongs, and queries the access control policy that is based on the security group and that is shown in Table 1-2.

For example, the source security group is an R&D group (group_R&D) and the destination security group is a marketing group (group_MKT), and then the access control policy is denying. The source security group is an employee group (group_EPL) and the destination security group is a marketing group (group_MKT), and then the access control policy is allowing.

In this embodiment of this disclosure, if a corresponding access control policy is allowing, step 2706 is performed. Otherwise, the first data packet is discarded. In some feasible implementations, if the corresponding access control policy is denying, the policy enforcement device may further send a response message to the source device. The response message is used to notify the source device that the destination device denies access of the source device.

2706: The policy enforcement device sends the first data packet to a destination authentication device.

In this embodiment of this disclosure, when the policy enforcement device determines that the corresponding access control policy is allowing, the policy enforcement device forwards the first data packet to the destination authentication device.

2707: The destination authentication device verifies the information about the destination security group.

In this embodiment of this disclosure, after receiving the first data packet sent by the policy enforcement device, the destination authentication device extracts the destination security group and the device identifier (to be specific, the IP address) from the first data packet, and then queries a corresponding security group based on the device identifier (to be specific, the IP address) of the destination device in the locally stored device identifier-security group binding table. If the two are the same, the verification succeeds; otherwise, the verification fails.

For example, Table 1-2 shows the device identifier-security group binding table stored in the destination authentication device, and the IP address of the destination device is 10.1.5.3. Therefore, it may be determined that a name of the corresponding security group is the business group (group_BSN). If the security group to which the destination device belongs is the business group (group_BSN), the destination authentication device determines that the security group to which the destination device belongs succeeds in the verification. Otherwise, for example, if the security group to which the destination device belongs and that is in the first data packet is the employee group (group_EPL), the verification fails.

In this embodiment of this disclosure, if the security group to which the destination device belongs succeeds in the verification, steps 2708 and 2709 are performed; otherwise, steps 2710 and 2711 are performed.

2708: The destination authentication device sends the first data packet to the destination device.

In this embodiment of this disclosure, when the destination authentication device forwards the first data packet to the destination device, an entire process from the source device to the destination device is completed.

2709: The destination device stores the security group to which the source device belongs in the local device identifier-security group binding table.

After receiving the data packet, the destination device extracts the device identifier (IP address) of the source device and the information about the source security group from the data packet, and stores the device identifier (IP address) and the information about the security group in the local device identifier-security group binding table.

Refer to steps 2601 and 2602. Details are not described herein again. Therefore, when the destination device is ready to send a response packet to the source device, the destination device may obtain the device identifier (IP address) of the source device and the security group to which the source device belongs from the locally stored device identifier-security group binding table, and does not need to obtain the device identifier (IP address) of the source device and the security group to which the source device belongs from a third-party service device such as a controller.

2710: The destination authentication device sends a second verification error message to the source device.

In this embodiment of this disclosure, when the verification by the destination authentication device fails, a reason may be that the destination device updates the security group to which the destination device belongs, for example, from the R&D group (group_R&D) to the marketing group (group_MKT). For a specific update process, refer to steps 2301 to 2305. Details are not described herein again. In some feasible implementations, when the source device sends the first data packet to the destination device, the source device may not update in time the security group to which the destination device belongs and that is in the device identifier-security group binding table. As a result, the first data packet sent by the source device still carries an old security group to which the destination device belongs, which is not a subjective malicious behavior.

Therefore, after receiving the first data packet sent by the source device, the destination authentication device may send the second verification error message to the source device, to notify that the destination security group is incorrect, and notify a correct destination security group to which the destination device belongs. In some feasible implementations, the destination device may send the second verification error message to the source device by using an Internet Control Message Protocol (ICMP).

2711: The source device updates the security group to which the destination device belongs.

In this embodiment of this disclosure, after receiving the second verification error message sent by the destination authentication device, the source device obtains the correct security group to which the destination device belongs from the second verification error message. In some feasible implementations, to prevent a malicious verification error message from causing the source device to change the security group to which the destination device belongs, to enable the source device to be unable to access the destination device, the source device may send a query message related to the destination device to the controller, to obtain a correct security group to which the destination device belongs, to update the security group to which the destination device belongs and that is in the device identifier-security group binding table. Refer to steps 2401 to 2404 or steps 2501 to 2505. Details are not described herein again. Therefore, when sending the first data packet to the destination device again, the source device obtains, from the device identifier-security group binding table, a new security group to which the destination device belongs, and the destination device can be normally accessed.

It should be noted that for ease of brief description, the foregoing method embodiments are represented as a series of action combinations. However, a person skilled in the art should appreciate that this disclosure is not limited to the described order of the actions, and because according to this disclosure, some steps may be performed in other orders or simultaneously. In addition, it should be further appreciated by a person skilled in the art that embodiments described in this specification all belong to preferable embodiments, and the related actions and modules are not necessarily required by this disclosure.

To better implement the solutions of embodiments of this disclosure, a related apparatus for implementing the solutions is further provided below.

Figure 3:
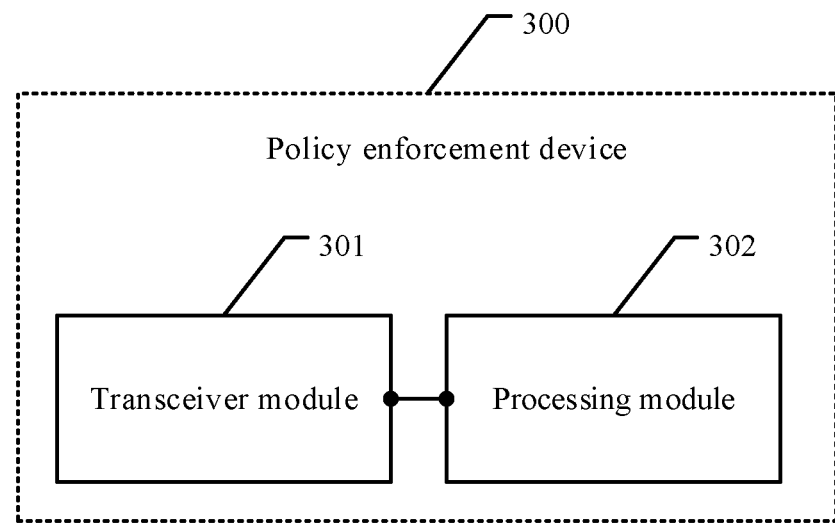
FIG. 3 is a schematic diagram of an embodiment of a policy enforcement device according to an embodiment of this disclosure.

Refer to FIG. 3. A policy enforcement device 300 provided in an embodiment of this disclosure may include a transceiver module 301 and a processing module 302.

The transceiver module 301 is configured to receive a first data packet sent by a source device. The first data packet carries information about a source security group and information about a destination security group. The source security group is a security group to which the source device belongs, and the destination security group is a security group to which a destination device of the first data packet belongs.

The processing module 302 is configured to determine a corresponding access rule based on the information about the source security group and the information about the destination security group. The access rule is allowing or denying.

The transceiver module 301 is configured to send the first data packet to the destination device if the access rule is allowing.

In some feasible implementations, the first data packet is an IPv6 packet, and an extension header of the first data packet carries the information about the source security group and the information about the destination security group.

In some feasible implementations, the transceiver module 301 is further configured to receive an access control policy sent by a controller. The access control policy includes the information about the source security group, the information about the destination security group, and the corresponding access rule.

In some feasible implementations, the processing module 302 is further configured to discard the first data packet if the access rule is denying.

In some feasible implementations, the first data packet is sent to a destination authentication device, so that the destination authentication device forwards the first data packet to the destination device.

Figure 4:
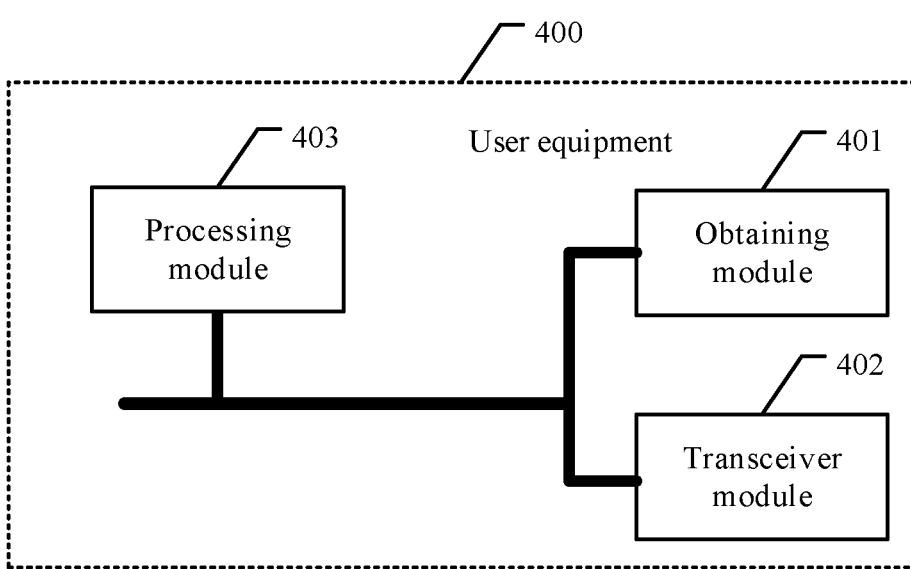
FIG. 4 is a schematic diagram of an embodiment of user equipment according to an embodiment of this disclosure.

Refer to FIG. 4. User equipment 400 provided in an embodiment of this disclosure is used as a source device, and includes: an obtaining module 401, a transceiver module 402, and a processing module 403.

The obtaining module 401 is configured to obtain information about a security group to which the source device belongs, to obtain information about a source security group.

The obtaining module 401 is further configured to obtain information about a security group to which a destination device of a first data packet belongs, to obtain information about a destination security group.

The transceiver module 402 is configured to send the first data packet to a policy enforcement device. The first data packet carries information about the source security group and the information about the destination security group.

In some feasible implementations, the first data packet is an IPv6 packet, and an extension header of the first data packet carries the information about the source security group and the information about the destination security group.

In some feasible implementations, the obtaining module 401 is configured to: send an authentication request to a source authentication device, where the authentication request carries a user identifier of the source device; and receive the information that is about the source security group and that is sent by the source authentication device.

In some feasible implementations, the obtaining module 401 is configured to: receive the information that is about the source security group and that is sent by the source authentication device.

In some feasible implementations, the obtaining module 401 is configured to: send a security group query request to a controller, where the security group query request carries an IP address and/or a user identifier of the destination device; and receive the information that is about the destination security group and that is sent by the controller.

In some feasible implementations, the obtaining module 401 is configured to: send the security group query request to a DNS server if the destination device is a server, where the security group query request carries an IP address, a domain name, and/or a user identifier of the destination device; and receive the information that is about the destination security group and that is sent by the controller.

In some feasible implementations, the obtaining module 401 is configured to: receive a second data packet sent by the destination device, where the second data packet carries the information about the destination security group to which the destination device belongs.

In some feasible implementations, the transceiver module 402 is further configured to: send the first data packet to the source authentication device, to enable the source authentication device to verify whether the source security group is the security group to which the source device belongs; if the source security group is not the security group to which the source device belongs, receive a first verification error message sent by the source authentication device; and send the first data packet to the policy enforcement device if the source security group is the security group to which the source device belongs.

In some feasible implementations, the transceiver module 402 is further configured to receive a second verification error message if the destination security group is not the security group to which the destination device belongs.

In some feasible implementations, the transceiver module 402 is further configured to send a security group update request to the controller, and receive information that is about a new security group and that is sent by the controller.

Figure 5:
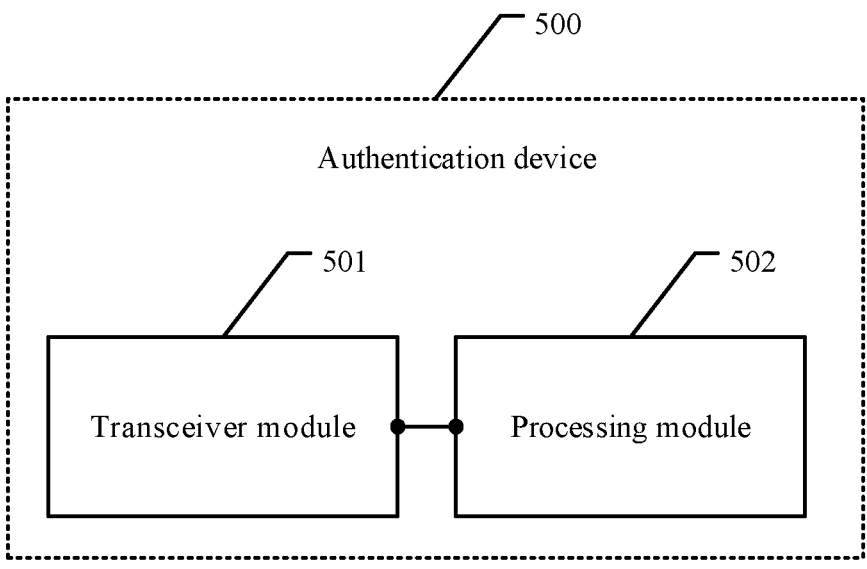
FIG. 5 is a schematic diagram of an embodiment of an authentication device according to an embodiment of this disclosure.

Refer to FIG. 5. An authentication device 500 provided in an embodiment of this disclosure is used as a source authentication device, and includes: a transceiver module 501 and a processing module 502.

The transceiver module 501 is configured to receive a first data packet sent by a source device, and first data packet carries information about a source security group.

The processing module 502 is configured to determine whether the source security group is a security group to which the source device belongs.

The transceiver module 501 is further configured to send the first data packet to a policy enforcement device if the source security group is the security group to which the source device belongs.

In some feasible implementations, the transceiver module is further configured to send a first verification error message to the source device if the source authentication device determines that the source security group is not the security group to which the source device belongs.

In some feasible implementations, the transceiver module is further configured to: receive an authentication request sent by the source device, where the authentication request carries a user identifier of the source device; send the authentication request to a controller; receive the information that is about the source security group and that is sent by the controller; and send the information about the source security group to the source device.

Figure 6:
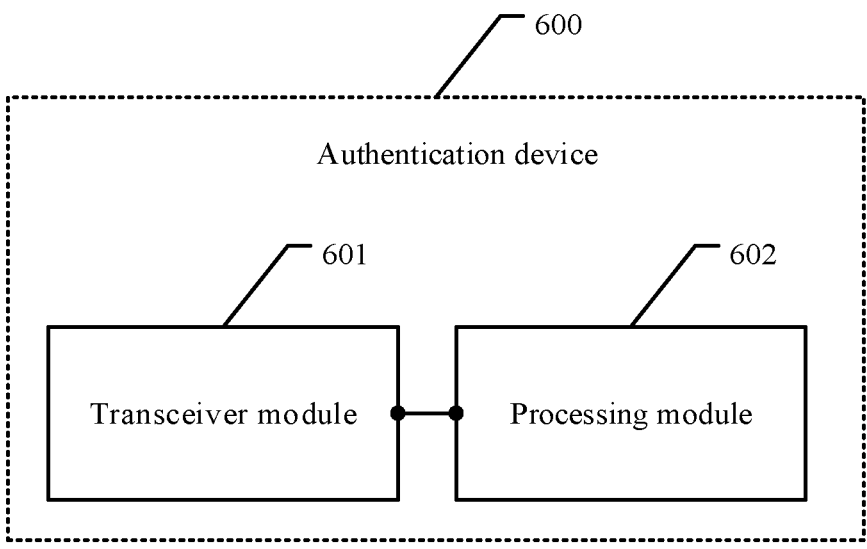
FIG. 6 is a schematic diagram of an embodiment of an authentication device according to an embodiment of this disclosure.

Refer to FIG. 6. An authentication device 600 provided in an embodiment of this disclosure is used as a destination authentication device, and includes: a transceiver module 601 and a processing module 602.

The transceiver module is configured to receive a first data packet sent by a source device, and the first data packet carries information about a destination security group. The processing module is configured to determine whether the destination security group is a security group to which a destination device belongs. The transceiver module is further configured to send the first data packet to the destination device if the destination security group is the security group to which the destination device belongs.

In some feasible implementations, the transceiver module 601 is further configured to discard the first data packet if the destination security group is not the security group to which the destination device belongs.

In some feasible implementations, the transceiver module 601 is further configured to send a second verification error message to the destination device if the destination security group is not the security group to which the destination device belongs.

It should be noted that, content such as information exchange between the modules/units of the apparatus and the execution processes thereof is based on the same idea as the method embodiments of this disclosure, and produces the same technical effects as the method embodiments of this disclosure. For specific content, refer to the foregoing descriptions in the method embodiments of this disclosure. Details are not described herein again.

An embodiment of this disclosure further provides a computer storage medium. The computer storage medium stores a program, and the program is used to perform some or all of the steps described in the foregoing method embodiments.

Figure 7:
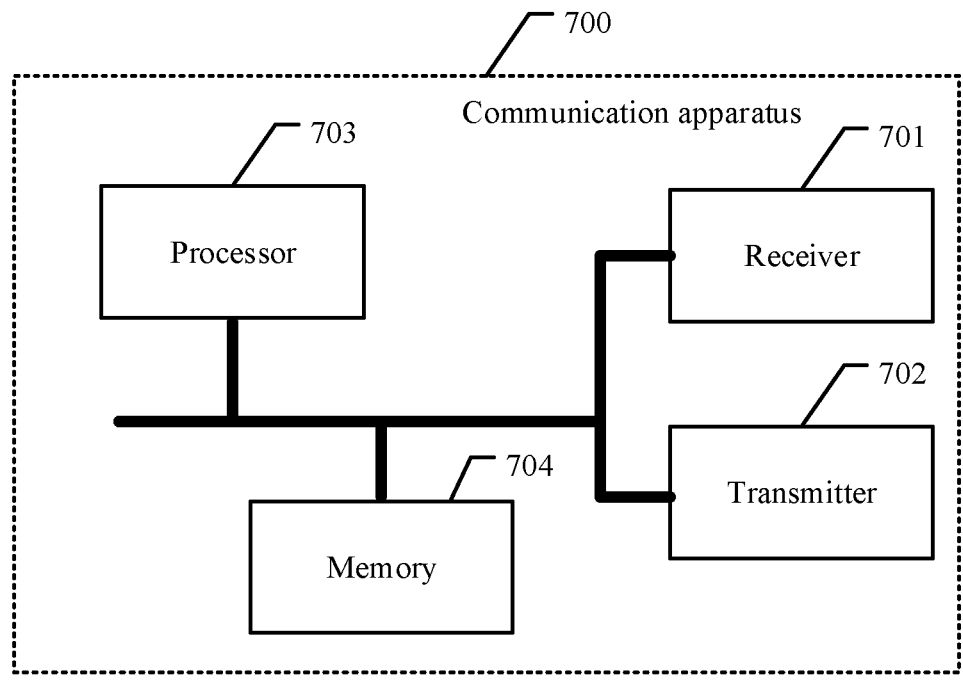
FIG. 7 is a schematic diagram of an embodiment of a communication apparatus according to an embodiment of this disclosure.

The following describes another communication apparatus according to an embodiment of this disclosure. Refer to FIG. 7. A communication apparatus 700 includes: a receiver 701, a transmitter 702, a processor 703, and a memory 704. In some embodiments of this disclosure, the receiver 701, the transmitter 702, the processor 703, and the memory 704 may be connected through a bus or in another manner, and in FIG. 7, a bus connection is used as an example.

The memory 704 may include a read-only memory (ROM) and a random-access memory (RAM), and provide instructions and data for the processor 703. A part of the memory 704 may further include a non-volatile random-access (NVRAM). The memory 704 stores an operating system and operation instructions, an executable module or a data structure, a subset thereof, or an extended set thereof. The operation instructions may include various operation instructions to implement various operations. The operating system may include various system programs, to implement various basic services and process a hardware-based task.

The processor 703 is configured to control an operation of the communication apparatus 700, and the processor 703 may also be referred to as a central processing unit (CPU). In a specific application, components of the communication apparatus 700 may be coupled together by using a bus system. In addition to a data bus, the bus system may further include a power supply bus, a control bus, a status signal bus, and the like. However, for clearer description, various types of buses in the figure are referred to as the bus system.

The method disclosed in the foregoing embodiments of this disclosure may be applied to the processor 703, or may be implemented by the processor 703. The processor 703 may be an integrated circuit chip and has a signal processing capability. In an implementation process, steps in the foregoing method may be implemented by using a hardware integrated logical circuit in the processor 703, or by using instructions in a form of software. The processor 703 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in embodiments of this disclosure. The general-purpose processor may be a microprocessor, or the processor may be any processor, or the like. The steps in the methods disclosed with reference to embodiments of this disclosure may be directly performed and completed by a hardware decoding processor, or may be performed and completed by a combination of hardware and a software module in the decoding processor. The software module may be located in a mature storage medium in the art such as a RAM, a flash memory, a ROM, a programmable read-only memory, an electrically erasable programmable memory, or a register. The storage medium is located in the memory 704, and the processor 703 reads information in the memory 704 and completes the steps in the foregoing methods in combination with hardware of the processor 703.

The receiver 701 may be configured to receive input digital or character information, and generate signal input related to related setting and function control of the communication apparatus 700. The transmitter 702 may include a display device such as a display screen. The transmitter 702 may be configured to output digital or character information by using an external interface.

In this embodiment of this disclosure, the processor 703 is configured to perform the access control method in 2101 to 2105, 2201 to 2205, 2301 to 2305, 2401 to 2404, 2501 to 2505, 2601 to 2602, and 2701 to 2711.

In another possible design, when the communication apparatus 700 is a chip, the chip includes: a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the method of sending wireless report information according to any one of the possible implementations of the first aspect. Optionally, the storage unit is a storage unit in the chip, for example, a register or a cache. Alternatively, the storage unit may be a storage unit that is in the terminal and that is located outside the chip, for example, a ROM or another type of static storage device that can store static information and instructions, or a RAM.

The processor mentioned anywhere above may be a general-purpose central processing unit, a microprocessor, an ASIC, or one or more integrated circuits (e.g., one or more processors) configured to control program execution of the methods.

In addition, it should be noted that the apparatus embodiments described above are merely an example. The units described as separate parts may or may not be physically separate, and parts displayed as units may or may not be physical units, may be located in one position, or may be distributed on a plurality of network units. Some or all of the modules may be selected based on an actual requirement, to achieve objectives of the solutions in embodiments. In addition, in the accompanying drawings of the apparatus embodiments provided in this disclosure, a connection relationship between modules indicates that the modules have a communication connection with each other, and may be implemented as one or more communication buses or signal cables.

Based on the description of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this disclosure, a software program implementation is a better implementation in most cases. Based on such an understanding, the technical solutions of this disclosure essentially or the part contributing to other technologies may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a server, or a network device) to perform the methods described in embodiments of this disclosure.

All or some of the foregoing embodiments may be implemented by using software, hardware, firmware, or any combination thereof. When software is used to implement the foregoing embodiments, all or some of the foregoing embodiments may be implemented in a form of a computer program product.

The computer program product includes one or more computer instructions. When the computer program instructions are loaded and executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

What is claimed is:

1. An apparatus, comprising:
a memory configured to store instructions; and
one or more processors coupled to the memory and configured to execute the instructions to:
receive, from a source device, a first data packet, wherein the first data packet is an Internet Protocol version 6 (IPv6) packet and comprises an extension header, wherein the extension header comprises first information about a source security group and second information about a destination security group, wherein the source security group comprises a first plurality of user equipments (UEs), wherein the source device belongs to the source security group, wherein the destination security group comprises a second plurality of UEs, and wherein a destination device belongs to the destination security group; and
send, to the destination device and based on an access rule corresponding to the first information and the second information, the first data packet when the access rule comprises allowing sending the first data packet.

2. The apparatus of claim 1, wherein before receiving the first data packet, the one or more processors are further configured to execute the instructions to receive, from a controller, an access control policy, and wherein the access control policy comprises the first information, the second information, and the access rule.

3. The apparatus of claim 1, wherein the one or more processors are further configured to execute the instructions to discard the first data packet when the access rule comprises denying sending the first data packet.

4. The apparatus of claim 1, wherein the one or more processors are further configured to execute the instructions to send, to a destination authentication device, the first data packet to enable the destination authentication device to forward, to the destination device, the first data packet.

5. An apparatus, comprising:
a memory configured to store instructions; and
one or more processors coupled to the memory and configured to execute the instructions to:
obtain first information about a first security group to which the apparatus belongs in order to obtain second information about a source security group;
obtain third information about a second security group to which a destination device of a first data packet belongs in order to obtain fourth information about a destination security group, wherein the first data packet is an Internet Protocol version 6 (IPV6) packet and comprises an extension header, wherein the extension header comprises the second information about the source security group and the fourth information about the destination security group, wherein the source security group comprises a first plurality of user equipments (UEs), wherein a source device belongs to the source security group, wherein the destination security group comprises a second plurality of UEs, and wherein the destination device belongs to the destination security group; and
send, to a policy enforcement device, the first data packet.

6. The apparatus of claim 5, wherein the one or more processors are further configured to execute the instructions to:
send, to a source authentication device, an authentication request carrying a user identifier of the apparatus; and
receive, from the source authentication device, the second information.

7. The apparatus of claim 5, wherein when the apparatus is a server, the one or more processors are further configured to execute the instructions to receive, from a source authentication device, the second information.

8. The apparatus of claim 5, wherein the one or more processors are further configured to execute the instructions to:
send, to a controller, a security group query request carrying an Internet Protocol (IP) address or a user identifier of the destination device; and
receive, from the controller, the fourth information.

9. The apparatus of claim 5, wherein the one or more processors are further configured to execute the instructions to:
send, to a Domain Name System (DNS) server, a security group query request when the destination device is a server, wherein the security group query request carries an Internet Protocol (IP) address;
receive, from a controller, the fourth information.

10. The apparatus of claim 5, wherein the one or more processors are further configured to execute the instructions to receive, from the destination device, a second data packet carrying the fourth information.

11. The apparatus of claim 5, wherein the one or more processors are further configured to execute the instructions to:
send, to a source authentication device, the first data packet to enable the source authentication device to verify whether the apparatus belongs to the source security group; and
receive, from the source authentication device, a first verification error message when the apparatus does not belong to the source security group.

12. The apparatus of claim 5, wherein the one or more processors are further configured to execute the instructions to receive a first verification error message when the destination device does not belong to the destination security group.

13. The apparatus of claim 5, wherein the one or more processors are further configured to execute the instructions to:

send, to a controller, a security group update request; and receive, from the controller, fifth information about a new security group.

14. An apparatus, comprising:

a memory configured to store instructions; and one or more processors coupled to the memory and configured to execute the instructions to:

receive, from a source device, a first data packet, wherein the first data packet is an Internet Protocol version 6 (IPv6) packet and comprises an extension header, wherein the extension header comprises first information about a source security group and second information about a destination security group, wherein the source security group comprises a first plurality of user equipments (UEs), and wherein the destination security group comprises a second plurality of UEs; and group;

send, to a policy enforcement device, the first data packet when the source device belongs to the source security group.

15. The apparatus of claim 14, wherein the one or more processors are further configured to execute the instructions to send, to the source device, a first verification error message when the source device does not belong to the source security group.

16. The apparatus of claim 14, wherein before receiving the first data packet, the one or more processors are further configured to execute the instructions to:

receive, from the source device, an authentication request carrying a user identifier of the source device;

send, to a controller, the authentication request;

receive, from the controller, the first information; and send, to the source device, the first information.

17. An apparatus, comprising:

a memory configured to store instructions; and one or more processors coupled to the memory and configured to execute the instructions to:

receive, from a source device, a first data packet, wherein the first data packet is an Internet Protocol version 6 (IPv6) packet and comprises an extension header, wherein the extension header comprises first information about a source security group and second about a destination security group, wherein the source security group comprises a first plurality of user equipments (UEs), and wherein the destination security group comprises a second plurality of UEs; and send, to a destination device, the first data packet when the destination device belongs to the destination security group.

18. The apparatus of claim 17, wherein the one or more processors are further configured to execute the instructions to discard the first data packet when the destination device does not belong to the destination security group.

19. The apparatus of claim 17, wherein the one or more processors are further configured to execute the instructions to send, to the destination device, a second verification error message when the destination device does not belong to the destination security group.

20. The apparatus of claim 5, wherein the one or more processors are further configured to execute the instructions to:

send, to a Domain Name System (DNS) server, a security group query request when the destination device is a server, wherein the security group query request carries a domain name; and receive, from a controller, the fourth information.

21. The apparatus of claim 5, wherein the one or more processors are further configured to execute the instructions to:

send, to a Domain Name System (DNS) server, a security group query request when the destination device is a server, wherein the security group query request carries a user identifier of the destination device; and receive, from a controller, the fourth information.

* * * * *